(12) United States Patent
Bostick et al.

(10) Patent No.: US 10,520,908 B2
(45) Date of Patent: Dec. 31, 2019

(54) UPDATING A DYNAMIC THRESHOLD OF A PARAMETER BASED ON PERFORMANCE REVIEW OF ANY DEVICE

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 15/845,974

(22) Filed: Dec. 18, 2017

(65) Prior Publication Data

US 2018/0364669 A1 Dec. 20, 2018

Related U.S. Application Data

(63) Continuation of application No. 15/625,435, filed on Jun. 16, 2017, now Pat. No. 10,345,780.

(51) Int. Cl.
*G05B 19/042* (2006.01)
*G06N 99/00* (2019.01)
(Continued)

(52) U.S. Cl.
CPC ....... *G05B 19/0426* (2013.01); *G05B 19/042* (2013.01); *G06F 8/65* (2013.01); *G06F 11/3013* (2013.01); *G06F 11/3409* (2013.01); *G06F 16/00* (2019.01); *G06F 16/211* (2019.01); *G06F 16/219* (2019.01); *G06N 20/00* (2019.01);
(Continued)

(58) Field of Classification Search
None
See application file for complete search history.

(56) References Cited

U.S. PATENT DOCUMENTS 6,108,614 A * 8/2000 Lincoln .................... F24F 11/30
702/183
6,137,805 A * 10/2000 Berstis ................ G06F 9/44505
370/428

(Continued)

OTHER PUBLICATIONS

Femminella et al, "Advanced Caching for Distributing Sensor Data through Programmable Nodes,".

(Continued)

*Primary Examiner* — Ramesh B Patel
(74) *Attorney, Agent, or Firm* — Patterson + Sheridan, LLP

(57) ABSTRACT

A computer program product and system for updating operating parameters of a consumer appliance. Respective operating conditions are received regarding a plurality of consumer appliances that are communicatively coupled to a database. Historical data tracking at least one component in the plurality of consumer appliances based on the operating conditions is generated. A trend, based on the data, as well as a first set of optimal operating parameters for operating the component in a first consumer appliance of the plurality of consumer appliances is determined. The first set of updated operating parameters is transmitted to the first consumer appliance to effect a change in an operation of the component in the first consumer appliance.

6 Claims, 8 Drawing Sheets

(51) Int. Cl.
*H04L 29/08* (2006.01)
*G06F 11/34* (2006.01)
*G06F 17/30* (2006.01)
*G06F 8/65* (2018.01)
*G06F 11/30* (2006.01)
*G06N 20/00* (2019.01)
*G06F 16/21* (2019.01)
*G06F 16/00* (2019.01)
*H04W 4/50* (2018.01)
*G06F 9/445* (2018.01)

(52) U.S. Cl.
CPC ............ *H04L 67/10* (2013.01); *H04L 67/125* (2013.01); *H04L 67/34* (2013.01); *G05B 2219/25064* (2013.01); *G06F 9/44505* (2013.01); *H04W 4/50* (2018.02)

(56) References Cited

U.S. PATENT DOCUMENTS

| | | | |
|---|---|---|---|
| 6,906,617 B1* | 6/2005 | Van der Meulen | G01R 19/2513 340/12.39 |
| 8,713,377 B2* | 4/2014 | Nuthi | G06F 11/3409 714/47.2 |
| 8,868,616 B1 | 10/2014 | Otto et al. | |
| 8,934,779 B2* | 1/2015 | Rope | H04B 17/101 398/136 |
| 9,098,096 B2* | 8/2015 | Matsuoka | G05D 23/1905 |
| 9,451,060 B1* | 9/2016 | Bowers | H04M 1/02 |
| 9,870,679 B2* | 1/2018 | Kleihorst | G08B 5/36 |
| 2002/0120502 A1* | 8/2002 | Sakaguchi | G06Q 30/02 705/14.49 |
| 2007/0180509 A1* | 8/2007 | Swartz | G06F 9/4406 726/9 |
| 2013/0214935 A1* | 8/2013 | Kim | H04L 12/2816 340/870.02 |
| 2015/0379785 A1* | 12/2015 | Brown, Jr. | A01B 79/005 701/29.1 |
| 2016/0178226 A1 | 6/2016 | Daubman et al. | |
| 2017/0364795 A1* | 12/2017 | Anderson | G06N 20/00 |
| 2018/0364668 A1* | 12/2018 | Bostick | G05B 19/0426 |

OTHER PUBLICATIONS

Md. Manzoor Murshed, "Adaptive Red With Dynamic Threshold Adjustment," Iowa State University, 2005, 42 pages.

Anonymous, "System and Method for Determining Resource Monitoring Thresholds Based on Workload and Performance," Jun. 13, 2013.

Remley et al., "Measurements in Harsh RF Propagation Environments to Support Performance Evaluation of Wireless Sensor Networks," 2009.

* cited by examiner

US 10,520,908 B2

UPDATING A DYNAMIC THRESHOLD OF A PARAMETER BASED ON PERFORMANCE REVIEW OF ANY DEVICE

CROSS-REFERENCE TO RELATED APPLICATIONS

This application is a continuation of U.S. patent application Ser. No. 10,345,780, filed Jun. 16, 2017, which is herein incorporated by reference in its entirety.

BACKGROUND

In any mechanical or electro-mechanical device there are various threshold values and operating parameters for various parts of the device. Generally, a manufacturer of the device determines the threshold values and operating parameters at the time the device is manufactured. However, setting the thresholds and operating parameters at the time of manufacture means these parameters are based on current knowledge and do not consider any additional information learned after the device is shipped. Further, by setting permanent thresholds and operating parameters when the device is new, the thresholds and operating parameters do not take into account the condition of the device when operating or as the device ages.

SUMMARY

One embodiment of the present disclosure is a computer program product for updating operating parameters of a first consumer appliance. The computer program product comprises a computer-readable storage medium having computer-readable program code embodied therewith. The computer-readable program code executable by one or more computer processors to receive respective operating conditions of a plurality of consumer appliances that are communicatively coupled to a database. Each of the operating conditions is based on sensor measurements obtained from a plurality of sensors associated with each of the plurality of consumer appliances. Each of the plurality of consumer appliances is a same type of appliance. The program code generates historical data tracking at least one component in the plurality of consumer appliances based on the operation conditions. The program code also identifies a trend corresponding to the component. The program code determines, based on the trend, a first set of optimal operating parameters for operating the component in a first consumer appliance of the plurality of consumer appliances. The program code updates a first set of initial operating parameters of the first consumer appliance based on the first set of optimal operating parameters. The first set of initial operating parameters is determined by the manufacturer of the first consumer appliance. The program code also transmits the first set of updated operating parameters to the first consumer appliance to effect a change in an operation of the component in the first consumer appliance.

Another embodiment of the present disclosure is a system comprising a database communicatively coupled with a plurality of consumer appliances through a communication network. The database is configured to receive respective operating conditions of the plurality of consumer appliances that are communicatively coupled to the database. Each of the operating conditions is based on sensor measurements obtained from a plurality of sensors associated with each of the plurality of consumer appliances. Each of the plurality of consumer appliances is the same type of appliance. The database generates historical data tracking at least one component in the plurality of consumer appliances based on the operation conditions. The database also identifies a trend corresponding to the component. The database determines, based on the trend, a first set of optimal operating parameters for operating the component in a first consumer appliance of the plurality of consumer appliances. The database updates a first set of initial operating parameters of the first consumer appliance based on the first set of optimal operating parameters. The first set of initial operating parameters is determined by the manufacturer of the first consumer appliance. The database transmits the first set of updated operating parameters to the first consumer appliance to effect a change in an operation of the component in the first consumer appliance.

BRIEF DESCRIPTION OF THE SEVERAL VIEWS OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein dynamically update operating parameters of a device. Generally, a device has different parameters and thresholds for operating that are set by the manufacturer. For example, a device may have a threshold for how fast a motor can safely be rotated, as well as operating parameters for the motor for various settings of the device. However, as the device is used (i.e., ages) the original threshold for how fast the motor can safely be rotated may change due to wear and tear. Further, the original operating parameters may no longer be the most efficient parameters for the motor. Thus, dynamically updating the thresholds and operating parameters of the device as the device ages may result in safer and more efficient operation of the device relative to using the original manufacturer settings.

Figure 1:
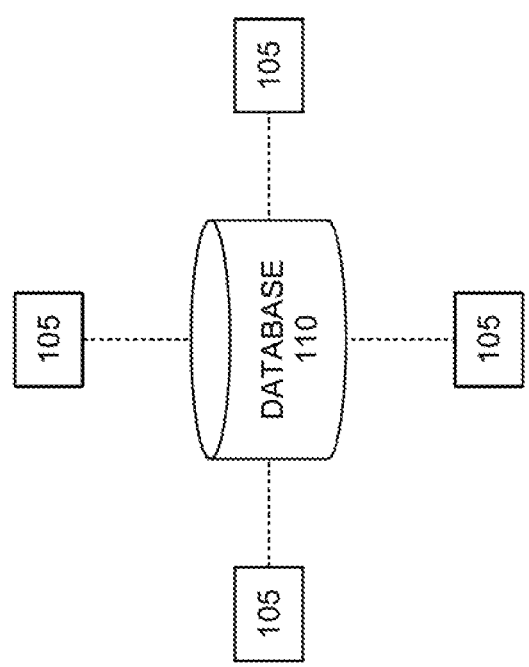
FIG. 1 illustrates a computing system for modifying operating parameters of a device, according to one embodiment described herein.

FIG. 1 illustrates a computing system 100 for modifying operating parameters of a device, according to one embodiment described herein. As shown, the computing system 100 includes a plurality of consumer appliances 105 communicatively coupled with a database 110. The consumer appliances 105 may be any consumer device or a household appliance such as a microwave, a washing machine, a dishwasher, an air conditioning unit, and so forth. In one embodiment, the database 110 is implemented as a single computing device having any suitable form. In other embodiments, the database 110 is a distributed computing device and includes a plurality of discrete computing devices that are connected through wired or wireless networking. While four consumer appliances 105 have been illustrated for simplicity, the system may contain any number and type of devices, and should not be limited to the embodiment shown.

In one embodiment, the consumer appliances 105 are communicatively coupled with the database 110 such that the consumer appliances 105 may transmit and receive data to and from the database 110. For example, the database 110 may communicate with the consumer appliances 105 via any suitable wireless communication method, such as Wi-Fi. As another example, the consumer appliances 105 may be physically connected with the database 110 via a wired connection, such as Ethernet cables, and the database 110 communicates with the consumer appliances 105 via the Ethernet cables. Further, the consumer appliances 105 may be connected to an external network (not shown), such as the Internet, or to additional consumer appliances 105. Also, the database 110 may be connected to an external network (not shown), such as the Internet, to additional databases, or to additional consumer appliances 105. While a single database 110 is shown for ease of explanation, it is to be understood that any number of databases may be used and should not be limited to the embodiment shown.

In one embodiment, the database 110 receives data transmitted from the consumer appliances 105. The database 110 may store historical operating data, sensor data, operating parameters, and thresholds of the consumer appliances 105. Further, the database 110 may store optimized parameters and updated thresholds for the consumer appliances 105. In one embodiment, the database 110 determines the optimized parameters of the consumer appliances 105 based on the data stored within the database 110. The database 110 may transmit the optimized parameters to the consumer appliances 105. While transmitting optimized parameters are described, it should be understood the database 110 can transmit any parameter, threshold, setting, etc., and should not be limited to the aforementioned examples.

Figure 2:
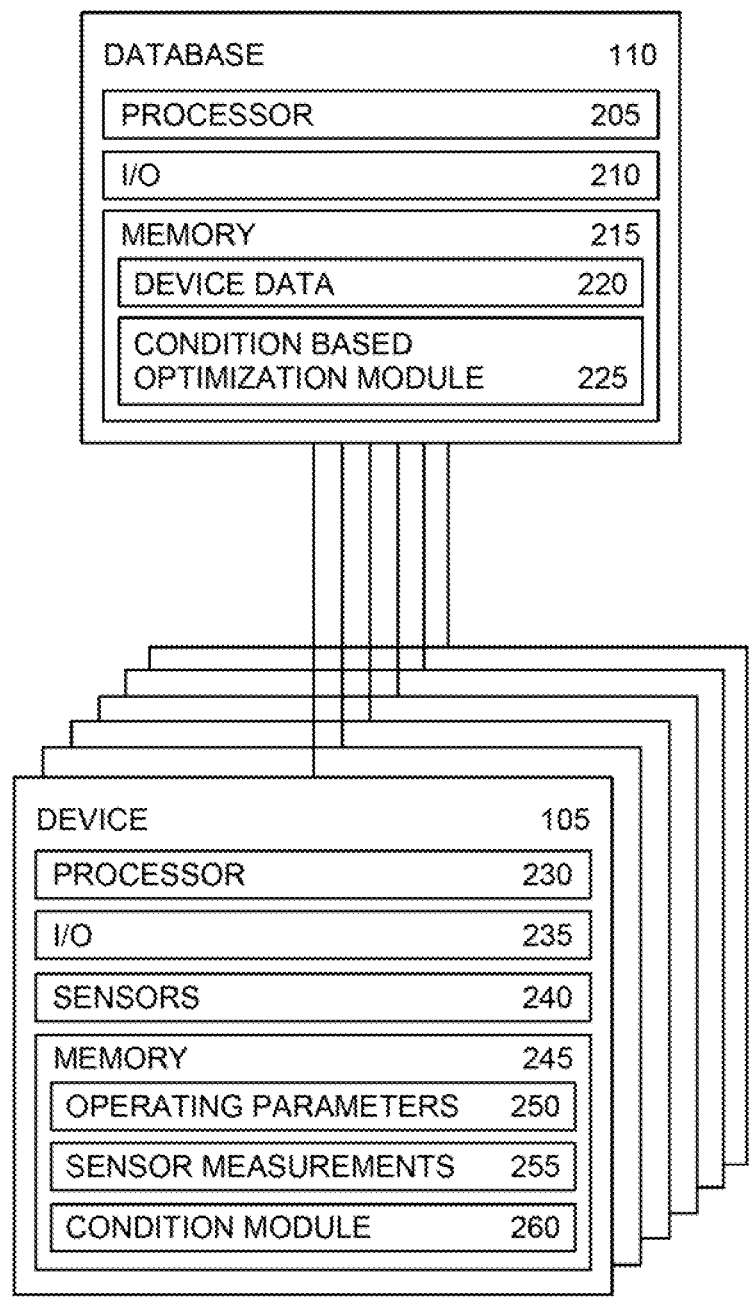
FIG. 2 illustrates a computing system for modifying operating parameters of a device, according to one embodiment described herein.

FIG. 2 illustrates a detailed version of the database 110 and the consumer appliances 105 of FIG. 1, according to one embodiment herein. The database 110 comprises a processor 205, an input/output (I/O) interface 210, and a memory 215. The processor 205 controls the operation of the database 110. The I/O 210 allows the database 110 to communicate with other electronic devices (e.g., the consumer appliances 105, network devices, etc.). For example, the I/O 210 may have physical data ports to establish a wired connection with the consumer appliances 105. Although not shown, the I/O 210 may include one or more antennas for wireless communication. In one embodiment, the database 110 is capable of communicating using the 802.11 wireless communication standard via the one or more antennas. In another embodiment, the database 110 is capable of communicating with a cellular network. Further, the database 110 may comprise a plurality of antennas for communicating using different standards. For example, one antenna may be capable of communicating using the 802.11 wireless standard, while another antenna is capable of communicating with a cellular network. Further, the I/O 210 may be coupled with a communication device (e.g., a wireless access point) for transmitting and receiving wireless signals. Thus, in some embodiments, the database 110 can communicate using a plurality of wireless networks.

The processor 205 may include any processing element suitable for performing functions described herein, and may include single or multiple core processors, as well as combinations thereof. While the database 110 is shown as having a single processor 205, in alternative embodiments the database 110 has a plurality of processors 205. The processor 205 may be included in a single computing device, or may represent an aggregation of processing elements included across a number of networked computing devices.

The memory 215 may include a variety of computer-readable media selected for their size, relative performance, or other capabilities: volatile and/or non-volatile media, removable and/or non-removable media, etc. The memory 215 may include cache, random access memory (RAM), Flash memory, a hard disk drive, a solid state drive, an optical storage device, and/or a magnetic storage device. As shown, the memory 215 includes device data 220 and a condition based optimization module 225.

In one embodiment, the device data 220 contains data received from the consumer appliances 105. Some non-limiting examples of the device data 220 are sensor data, condition data, location data, status of the device, device settings, make and model, operating parameters, and so forth. In one embodiment, the device data 220 contains all the data relating to a consumer appliance 105. For example, the database 110 may contain data on thousands of units of a single type of laundry machine. In another embodiment, the device data 220 contains the average of the device data stored in the database 110. That is, the database 110 may take the average of each of the types of condition data in order to simplify the analysis of the data. In an alternative example, the database 110 provides the data on the laundry machines to one of the laundry machines. The laundry machine determines the average data for the laundry machine from the data provided by the database 110.

As shown, memory 215 also contains condition based optimization module 225. The condition based optimization module 225 determines the ideal parameters for operating each of the consumer appliances 105 based on respective condition of each of the consumer appliances 105. In one embodiment, the condition based optimization module 225 comprises program code that when executed by the processor 205 performs a variety of functions for determining optimized parameters and thresholds for a consumer appliance 105 based on the device data 220, as will be discussed in further detail below with regards to FIG. 4. In one embodiment, the condition based optimization module 225 uses the data of all the consumer appliances 105 stored in the database 110 to determine the optimized parameters. While the condition based optimization module 225 is shown within memory 215 of the database 110, the condition based optimization module 225 may be within the memory 245 of the consumer appliance 105. Those skilled in the art would appreciate that the memory 215 may contain additional items such as firmware for operating the database 110, which have not been illustrated for simplicity.

The consumer appliances 105 are illustrated with a processor 230, an I/O interface 235, sensors 240, and a memory 245. The processor 230 controls the operation of the consumer appliance 105. The I/O 235 allows the consumer appliance 105 to communicate with other electronic devices (e.g., the database 110, network devices, etc.). For example, the I/O 235 may have physical data ports to establish a wired connection with the database 110. Further, the I/O 235 may be coupled with antennas for the consumer appliance 105 to communicate wirelessly.

The processor 230 may include any processing element suitable for performing functions described herein, and may include single or multiple core processors, as well as combinations thereof. While the consumer appliance 105 is shown as having a single processor 230, in alternative embodiments the consumer appliance 105 has a plurality of processors 230. The processor 230 may be included in a single computing device, or may represent an aggregation of processing elements included across a number of networked computing devices.

The sensors 240 may be distributed throughout the consumer appliance 105 to measure characteristics of the consumer appliance 105 and the surroundings of the consumer appliance 105, and can be any suitable sensor capable of detecting information relating to the consumer appliance 105. Some non-limiting examples are temperature sensors, voltage sensors, current sensors, accelerometers, and so forth. In one embodiment, the sensors 240 indicate the operating condition of the consumer appliance 105. For example, the consumer appliance 105 may be a washing machine, and the sensors 240 may detect the motor rotations per minute (RPMs), whether the drain of the washing machine is clogged, whether the door to the washing machine is open, whether there is any damage to a component of the washing machine, and so forth. Thus, the sensors 240 monitor and provide information about the consumer appliances 105.

The memory 245 may include a variety of computer-readable media selected for their size, relative performance, or other capabilities: volatile and/or non-volatile media, removable and/or non-removable media, etc. The memory 245 may include cache, random access memory (RAM), Flash memory, a hard disk drive, a solid state drive, an optical storage device, and/or a magnetic storage device. As shown, the memory 245 operating parameters 250, sensor measurements 255, and condition module 260. In one embodiment, the condition module 260 is located within memory 215 of the database 110 such that the consumer appliance 105 provides information from the sensors 240 to the database 110, and the database 110 determines the condition of the consumer appliance 105. The sensor measurements 255 contain data measured by the sensors 240 regarding the consumer appliance 105. In one embodiment, the sensor measurements 255 contain error messages produced by the sensors 240 such as if a component of the consumer appliance 105 is damaged. Those skilled in the art would appreciate that the memory 245 may contain additional items such as firmware for operating the consumer appliance 105, which have not been illustrated for simplicity.

The operating parameters 250 contain settings and thresholds for operating the consumer appliance 105. In one embodiment, the operating parameters 250 contain the parameters for operating components within the consumer appliance 105. Returning to the aforementioned example of the washing machine, the parameters 250 may contain settings based on the different wash cycles of the washing machine. For example, the parameters 250 may dictate for each of the wash cycles the water temperature, the speed of the motor, the amount of water used, and so forth. The operating parameters 250 may also contain thresholds for components of the consumer appliance 105. As one example, the motor may have a maximum safe threshold speed of 1,500 RPMs. If the motor begins to spin too rapidly, the consumer appliance 105 may reduce power to or shutdown the motor to ensure no damage is done to the washing machine. In one embodiment, the operating parameters 250 are initially set by the manufacturer when the consumer appliance 105 is built but later are updated dynamically based on the current condition of the consumer appliance 105 as will be described in more detail with reference to FIG. 4.

The condition module 260 determines the condition of the consumer appliance 105 based on the sensor measurements 255. In one embodiment, the condition based optimization module 225 comprises program code that when executed by the processor 205 performs a variety of functions for determining optimized parameters and thresholds for a consumer appliance 105 based on the device data 220, as will be discussed in further detail below with regards to FIG. 4. In one embodiment, the condition of the consumer appliance 105 is based on the condition of the individual components of the consumer appliance 105. As one example, the condition module 260 may determine the condition of the motor of a washing machine based upon the current used, the motor's age, damage to the motor, and any error messages associated with the motor. In one embodiment, the condition module 260 determines the condition of the consumer appliance 105 indirectly from the sensor measurements 255.

For example, the condition module 260 may determine that the motor of the washing machine is drawing more current than normal, which may be due to wear and tear on the parts of the motor such that the motor needs additional current (e.g., 20% more than a new unit) to reach a desired operating speed for the washing machine. From this information, the condition module 260 may recognize the motor is operating at 80% functionality compared to a brand new motor (i.e., one operating at 100% functionality). In this manner, the condition module 260 can determine the condition of the consumer appliance 105 from the sensor measurements 255. In one embodiment, the condition module 260 is run periodically (e.g., once a day, week, month, year, etc.) to determine the condition of the consumer appliance 105. In one embodiment, the condition module 260 is run based on a command from the database 110.

Although not shown, the consumer appliances 105 may include one or more antennas for wireless communication. In one embodiment, the consumer appliances 105 are capable of communicating using the 802.11 wireless communication standard via the one or more antennas. In another embodiment, the consumer appliances 105 are capable of communicating with a cellular network. Further, the consumer appliances 105 may comprise a plurality of antennas for communicating using different standards. For example, one antenna may be capable of communicating using the 802.11 wireless standard, while another antenna is capable of communicating with a cellular network. Thus, in some embodiments, the consumer appliances 105 can communicate using a plurality of wireless networks.

Figure 3:
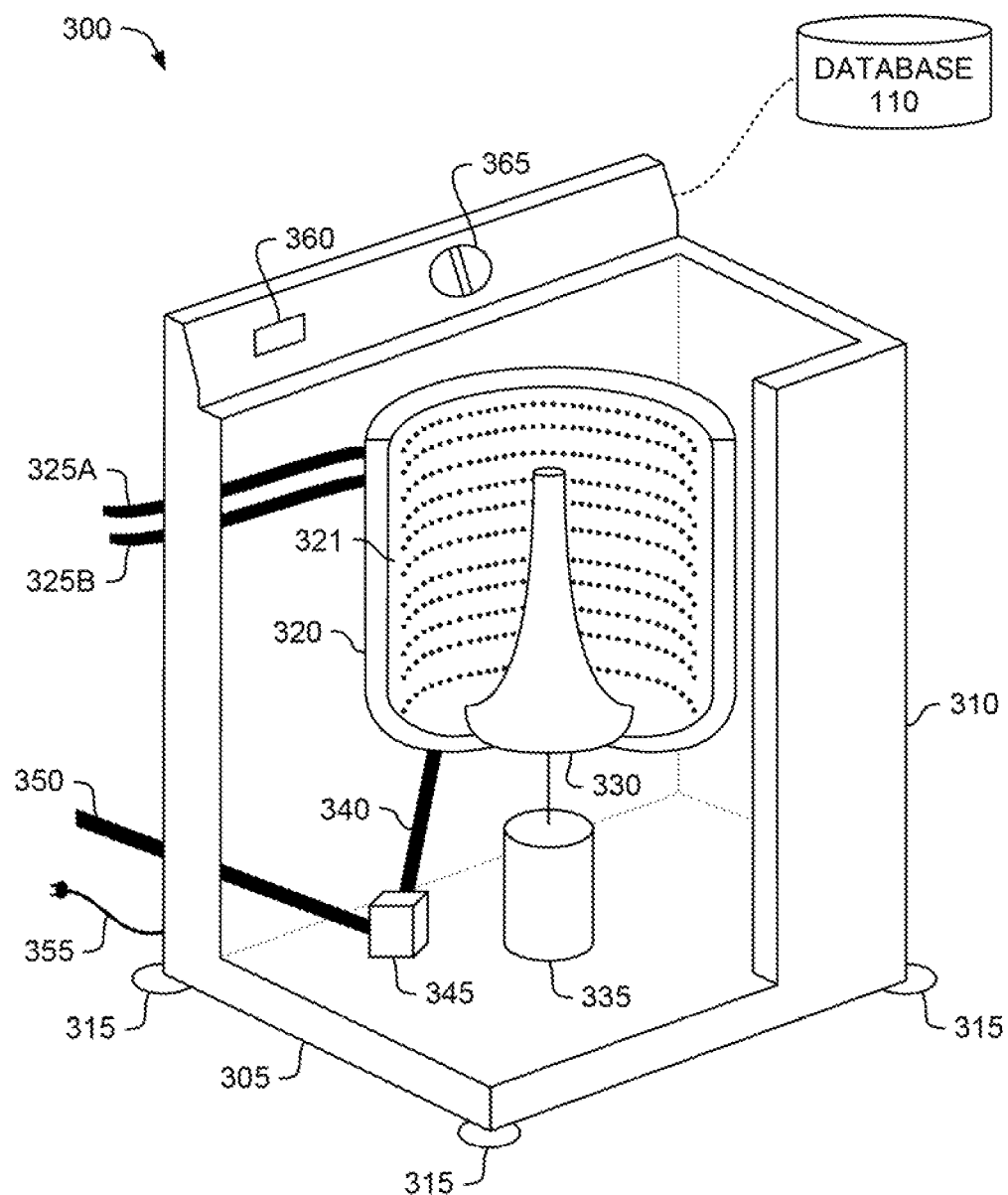
FIG. 3 illustrates a system for modifying operating parameters of a device, according to one embodiment described herein.

FIG. 3 illustrates a system 300 for modifying operating parameters of a device, according to one embodiment described herein. The system 300 provides an example of the system 100 as shown in FIG. 1. Specifically, the system 300 illustrates a washing machine 305 communicatively coupled with the database 110. While a single consumer appliance is shown in FIG. 3 for ease of explanation, the application should not be limited to such an embodiment because a person skilled in the art should appreciate that any type and any number of devices may be used.

The washing machine 305 has a frame 310 resting on feet 315. The washing machine 305 has a tub 320 for holding clothes (not shown). The tub 320 has an inner tub 321 with a plurality of holes for allowing water placed within the tub 320 to douse the clothes, as well as to allow the water to drain out of the inner tub 321. The tub 320 is connected to inlet water hoses 325A and 325B, which provide water to the tub 320 for washing the clothes. The tub 320 also has an agitator 330 for moving the clothes to help wash the clothes. The agitator 330 is mechanically connected with a motor 335 to rotate the agitator 330. Further, the tub 320 is mechanically connected with the motor 335 to rotate the tub. For example, the agitator 330 may spin freely in the counterclockwise direction, but in the clockwise direction the agitator 330 and the tub 320 lock so that both are spun by the motor 330. The motor 330 spins the tub 320 at a predetermined speed to help wring the water out of the clothes. Also connected to the tub 320 is an inner drain pipe 340, which allows a water pump 345 to drain water out of the tub 320. The water pump 345 is connected with an outer drain pipe 350 to remove the water from the washing machine 305.

The washing machine 305 has a power supply 355 that provides electrical power to the various electrical components of the washing machine 305. The washing machine 305 also has a power switch 360 for turning the washing machine on and off, as well as a dial 365 for selecting different settings for washing clothes. In one embodiment, each of the aforementioned components of the washing machine 305 has at least one sensor (not shown) associated with the component. While not shown for simplicity, the washing machine 305 encompasses all aspects of the consumer appliance 105 described with reference to FIG. 1 (i.e., the processor 230, I/O 235, memory 245, etc.).

Figure 4:
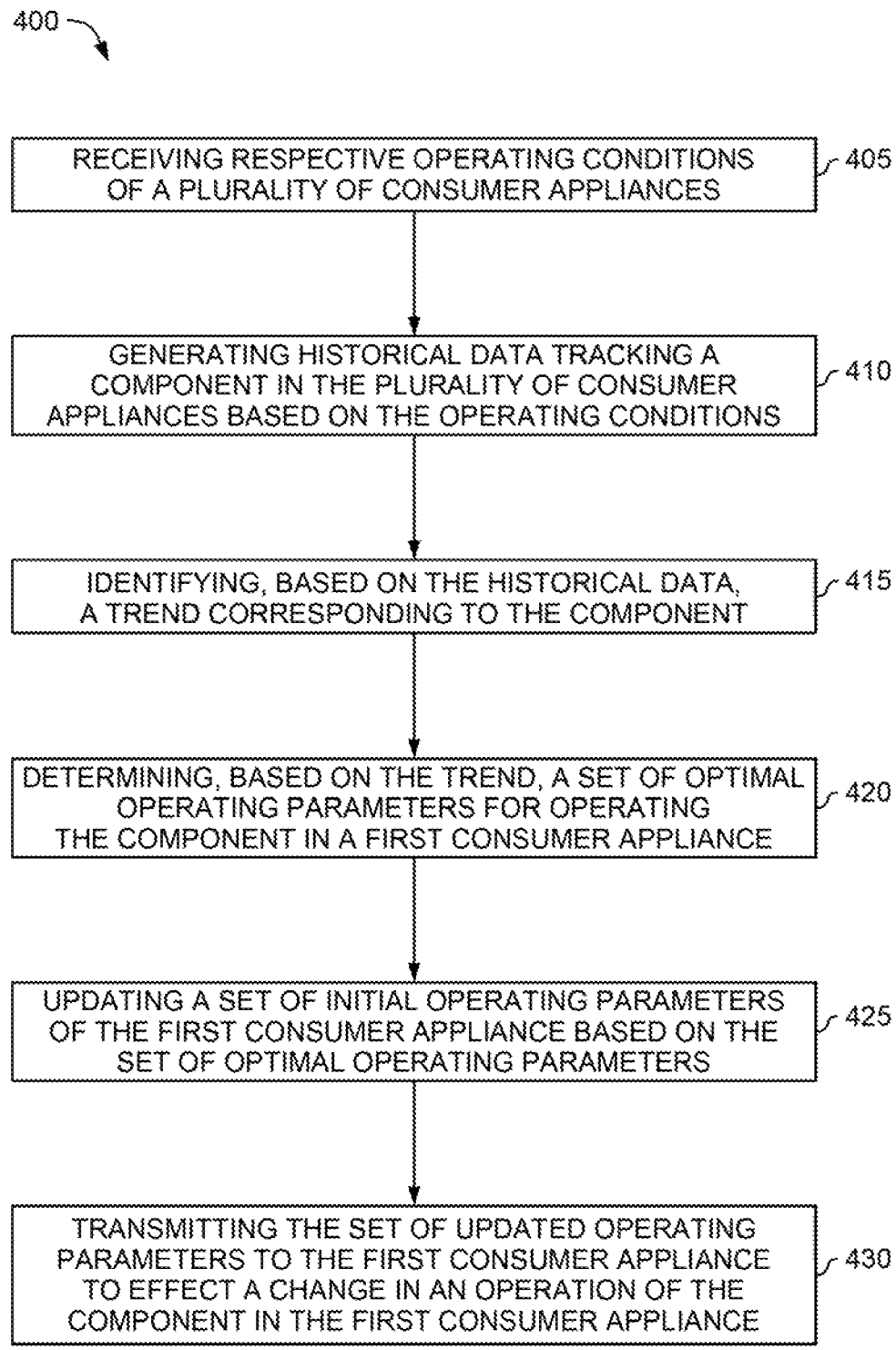
FIG. 4 illustrates a flow chart for dynamically updating operating parameters of a device, according to one embodiment described herein.

FIG. 4 illustrates a flow chart 400 for dynamically updating operating parameters of a device, according to one embodiment described herein. In one embodiment, the operating parameters are determined by the condition based optimization module 225 (FIG. 2). For ease of explanation, the flow chart 400 will be described with reference to FIG. 2 as well as the system 300 of FIG. 3. While the flow chart 400 is described with reference to a single consumer appliance 105, a person skilled in the art would recognize the flow chart 400 may apply to any number of consumer appliances 105.

At block 405, the condition based optimization module 225 receives respective operating conditions of a plurality of consumer appliances. In one embodiment, the consumer appliance 105 transmits the condition of the consumer appliance to the database 110. In one embodiment, the condition module 260 determines the operating condition of a consumer appliance based on sensor data. In one embodiment, the sensor measurements 255 directly convey the condition of the consumer appliance 105. As an example, the sensor measurements 255 may contain information on the age of the consumer appliance 105 (e.g., the number of hours run, the number of cycles run, etc.), the power usage of the consumer appliance 105, an error message associated with the consumer appliance 105, whether the consumer appliance 105 is damaged, whether there is any wear and tear, and so forth. In one embodiment, the condition module 260 comprises a finite state machine that determines the condition of the consumer appliance 105 based on errors reported to the finite state machine. The errors reported to the finite state machine may or may not be detected by sensors.

In another embodiment, the condition module 260 calculates the condition of the consumer appliance 105 from the sensor measurements 255. As one example, referring back to the motor 335 of the washing machine 305 of FIG. 3, the motor 335, when brand new may rotate at a speed of 1,500 RPMs while drawing a current of 1.5 amps. When determining the condition of the washing machine 305, sensors associated with the motor 335 may indicate the motor 335 draws a current of 2.0 amps while rotating at a speed of 1,500 RPMs. Thus, in this example, the motor 335 is drawing an additional 0.5 amps to achieve the same number of RPMs as a brand new motor. The condition module 260 recognizes the motor 335 is drawing more power than when new, and assigns an appropriate condition to the motor 335. As an example, the condition module 260 may determine the motor 335 has a condition of 66% because the motor is drawing 33% more power than a new motor. While the condition is represented as a percentage for ease of explanation, any indicator of the condition of the component may be used. The condition module 360 may determine the decrease in performance is from the age of the motor, whether the motor is dirty, whether there is normal wear and tear to the motor, and so forth.

As another example, a sensor associated with the tub 320 indicates the tub 320 is draining slowly. Recognizing that there may be several reasons why the tub 320 is draining slowly, the condition module 260 assesses the sensor measurements for all components that allow the tub 320 to drain. That is, the condition module 260 evaluates the sensor measurements 255 for the inner drain pipe 340, the water pump 345, and the outer drain pipe 350 to determine the exact cause of tub 320 draining slowly. In this example, the inner drain pipe 340 is not clogged, and the water pump 345 is operating normally. Thus, the condition module 260 may determine from this information that the outer drain pipe 350 is clogged without needing to ascertain the sensor measurements from the outer drain pipe 350. As one example, the sensor associated with the outer drain pipe 350 may be nonfunctional or may be providing measurements that indicate the drain pipe 350 is not clogged, but other sensors throughout the washing machine 305 indicate the outer drain pipe 350 is clogged. As another example, the sensor associated with the outer drain pipe 350 may be used as backup for the other sensors such that the sensor associated with the outer drain pipe 350 is only used if the other sensors are malfunctioning. In this manner, the condition module 260 may not use the sensor associated with the outer drain pipe 350 to determine the status of the outer drain pipe 350. However, the condition module 260 may still assess the sensor associated with the outer drain pipe 350 to determine the extent of the clog. In this manner, the condition module 260 may use sensor measurements 255 from multiple sensors to determine the condition of a component.

In one embodiment, a respective condition is determined for each of the components of the consumer appliance. As an example, the condition of the washing machine 305 may be determined from each of the components shown in FIG. 3 (e.g., the motor 335, the water pump 345, the power supply 355, and so forth). In one embodiment, each of the components is weighted a respective amount such that the condition of the washing machine is based on a weighted value of the respective components condition. Thus, in this example, the condition of the washing machine 305 is based on the condition of the components of the washing machine 305. In another embodiment, a respective condition is determined for each of the components of a plurality of devices.

At block 410, the condition based optimization module 225 generates historical data tracking a component in the plurality of consumer appliances based on the operating conditions. In one embodiment, the historical data contains the condition data of the consumer appliance over a period of time. In one embodiment, the historical data tracks the condition of each of the individual components of each of the consumer appliances over a period of time. In one embodiment, the device data 220 contains the historical data.

At block 415, the condition based optimization module 225 identifies, based on the historical data, a trend corresponding to the component. In one embodiment, the condition based optimization module 225 determines a trend based on the device data 220. The trend may be a historical trend for a consumer appliance as a whole or for the individual components of the consumer appliance. For example, the condition based optimization module 225 may track historical data based on the conditions of the washing machine 305. Based on the device data 220, the condition based optimization module 225 can determine that after a hundred cycles, the likelihood of failure of the motor 335 jumps dramatically by determining trends in the historical data of the plurality of washing machines 305. To try to reduce the likelihood of failure, the condition based optimization module 225 provides instructions to the washing machine 305 to reduce the maximum RPM of the motor 335, as explained in further detail with regard to block 420.

At block 420, the condition based optimization module 225 determines, based on the trend, a set of optimal operating parameters for operating the component in a first consumer appliance. In one embodiment, the condition based optimization module 225 determines a set of optimal operating parameters based on a trend in the device data 220. In one embodiment, the condition based optimization module 225 determines a plurality of optimal parameters for the consumer appliance 105 based on varying conditions. As an example, the condition based optimization module 225 communicates with a plurality of units of the same model of washing machine as washing machine 305. Each of these washing machines regularly determines their respective condition, and provides this information to the condition based optimization module 225. The condition based optimization module 225 then stores this information in the device data 220. That is, the device data 220 of the database 110 contains multiple entries of data for each of the 1,000 washing machines. The condition based optimization module 225 may use all of the data stored within the device data 220 to determine the optimal settings for each of the washing machines.

In one embodiment, optimal operating parameters are determined for a plurality of consumer appliances from the data stored in the database. In another embodiment, each of the respective consumer appliances has a different set of optimal operating parameters based on the condition of each of the respective consumer appliances. In a further embodiment, each of the components of the plurality of consumer appliances has a different operating parameter. In one embodiment, the individual operating parameters for each of the components of one device are different than the individual operating parameters for each of the components of a second device such that each device has specific operating parameters. In this manner, each of the components of each of the consumer appliances may receive individual operating parameters tailored to the condition of the component based on the respective conditions of the components.

In one embodiment, the condition based optimization module 225 is capable of self-learning how to best maintain the washer 305 from the device data 220. As an example, the condition based optimization module 225 tracks the data related to the motor 335 of a plurality of washing machines 305 over a period of time to generate historical data. Initially, the motor 335 is set by the manufacturer to rotate at a maximum speed of 1,500 RPMs. However, based on the collected historical data, the condition based optimization module 225 has determined that if the motor has been used for more than a hundred cycles, the maximum RPM should be reduced to lengthen the life of the motor 335. Stated differently, if the motor 335 continues to be set at a maximum speed of 1,500 RPMs after 100 cycles, the motor 335 will experience significant wear and tear. However, based on the device data 220, the condition based optimization module 225 determines that if the maximum speed is set to 1,400 RPMs, the life of the motor 335 will be extended without significantly impacting the capability of the motor 335. Thus, the condition based optimization module 225 determines the optimal operating parameter for the motor 335 in this example is a maximum speed of 1,400 RPMs.

As another example, the condition based optimization module 225 tracks historical data for the motor 335 and determines from the historical data a trend that the motor 335 appears to be failing faster than intended. For example, the motors have a 70% likelihood of failing before a desired date. This may be due to the manufacturer setting the initial operating parameters of the motor 335 too high such that the higher speeds are wearing the motor 335 down faster than normal. Thus, the condition based optimization module 225 can adjust the initial settings for the motor 335 to prevent the premature failure of the motor 335. In this manner, the condition based optimization module 225 adjusts the operating parameters, even for a brand new washing machine 305, in order to prevent damage to the motor 305.

As a further example, the condition based optimization module 225 tracks all of the data for the water pump 345. The condition based optimization module 225 may analyze the device data 220 to determine a trend for water pumps 345 that fail. The condition based optimization module 225 may determine that the washing machines 305 with failed water pumps 345 also report issues with the outer drain pipe 350. In this example, the sensors associated with the outer drain pipe 350 reported a minor clog that was not significant enough to warrant a repair. On the other hand, those washing machines 305 that do not have minor clogs in the outer drain pipe 350 do not have water pump 345 failures. Based on this information, the condition based optimization module 225 may recognize that the minor clogs in the outer drain pipe 350 are causing the water pump 345 to fail at a higher rate than normal. Thus, the condition based optimization module 225 may redefine what clog warrants a repair. That is, the condition based optimization module 225 may send an update out to the washing machines 305 that redefines the minor clog as something that needs to be repaired in order to prevent the water pump 345 from failing. In this manner, the condition based optimization module 225 is capable of self-learning how to best maintain the washer 305 from the device data 220.

In one embodiment, the condition based optimization module 225 determines the optimal operating parameters based on an identified trend for each of the components of the consumer appliance, and may determine the importance of each component based on the historical trend. In one embodiment, the condition based optimization module 225 weighs the condition of each component equally when determining a set of optimal operating parameters. In another embodiment, the condition based optimization module 225 weighs the condition of each of the components differently, based on a historical trend of the component, when determining a set of optimal operating parameters. For example, if the consumer appliance is an air conditioning (AC) unit, the condition based optimization module 225 may track the condition of an air filter associated with the AC unit, a compressor, a thermostat, and so forth. Initially, the condition based optimization module 225 may weigh the condition of each of the components equally. However, over time the condition based optimization module 225 may determine that the condition of the air filter (e.g., clean, dirty, etc.) is the most important factor in the lifespan of the AC unit. In response, the condition based optimization module 225 may place a greater importance on the condition of the air filter when determining the optimal operating setting for the AC unit. In this manner, the condition based optimization module 225 can determine the optimal operating parameters for a consumer appliance based on a trend of at least one of the components of the consumer appliance.

At block 425, the condition based optimization module 225 updates an initial set of operating parameters of the first consumer appliance based on the set of optimal operating parameters. In one embodiment, the device data 220 comprises the operating parameters for each of the consumer appliances 105. In one embodiment, the condition based optimization module 225 automatically updates operating parameters 250 of the consumer appliance 105 because the condition based optimization module 225 determined from the device data 220 that the consumer appliance 105 is not running the optimal settings. In another embodiment, the consumer appliance 105 requests that the condition based optimization module 225 updates the operating parameters 250.

At block 430, the condition based optimization module 225 transmits the updated operating parameters to the first consumer appliance to effect a change in an operating of the component in the first consumer appliance. In one embodiment, the condition based optimization module 225 automatically transmits the updated operating parameters to the consumer appliance 105. The operating parameters may be set at predetermined times or may be sent as soon as the condition based optimization module 225 updates the operating parameters. In one embodiment, the consumer appliance 105 requests that the condition based optimization module 225 transmits the operating parameters to the consumer appliance. The flow chart ends after block 430.

Figure 5:
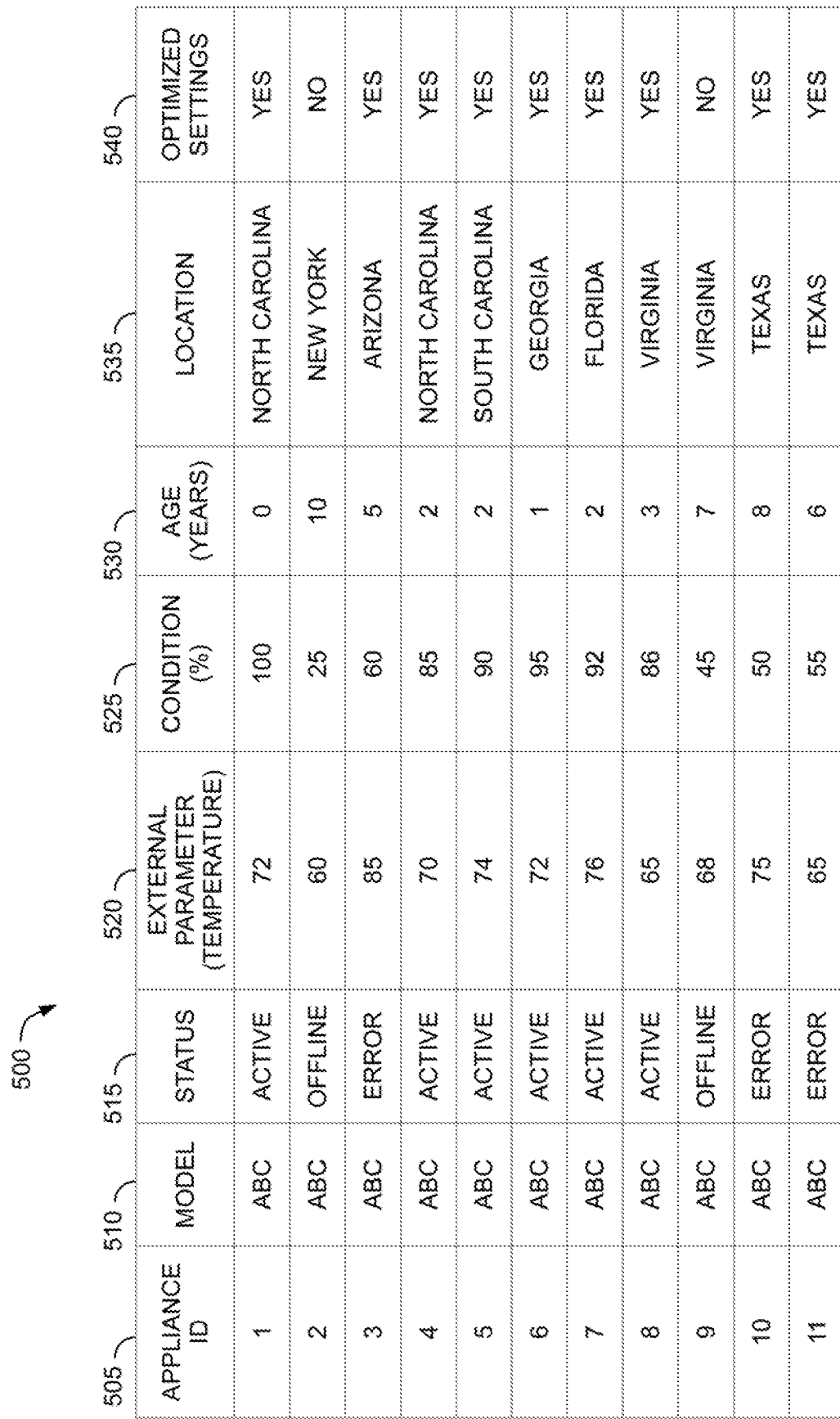
FIG. 5 illustrates a data structure, according to one embodiment described herein.

FIG. 5 illustrates a chart 500, according to one embodiment described herein. The chart 500 tracks various types of information relating to various consumer appliances associated with the data structure. In one embodiment, the database 110 uses the chart 500 to track data on a plurality of consumer appliances 105. In one embodiment, the condition based optimization module 225 uses the chart 500 to determine a trend in data for the consumer appliances. As shown, the chart 500 has columns for device ID 505, model 510, status 515, external parameter 520, condition 525, age 530, location 535, and optimized settings 540.

The appliance ID 505 identifies a specific consumer appliance that is being tracked. The chart 500 lists appliances 1-11 that are being tracked. The condition based optimization module 225 may use the appliance ID 505 to track specific washing machines so that trends may be determined from each of the washing machines individual characteristics. The model 510 indicates which model consumer appliance is associated with the respective device ID 505. As shown, the chart 500 is tracking one model "ABC". While only a single model is shown for ease of explanation, a person of ordinary skill would appreciate chart 500 may track any number of models and appliances.

The status 515 indicates the status of the respective consumer appliance such as active, offline, or has an error. A consumer appliance may have a status 515 of ACTIVE when the appliance is fully operational and communicating with the database 110. A consumer appliance may have a status 515 of ERROR when there is an error within the consumer appliance (e.g., broken component, lost power, etc.) such that the consumer appliance is not fully operational. A consumer appliance may have a status 515 of OFFLINE when the consumer appliance is not communicating with the database 110. For example, the consumer appliance may not have power, may be powered down for maintenance, is no longer able to communicate due to a component failure, or has simply been removed from service (e.g., thrown out). The condition based optimization module 225 may use the status 515 to determine a trend for the consumer appliances. While three status indicators are used for simplicity, a person skilled in the art would appreciate that any number or type of status indicators may be used.

The external parameter 520 provides information on a parameter that is external to the consumer appliance. As shown, the external parameter 520 provides the external temperature of the consumer appliance. The condition based optimization module 225 may use the external parameter 520 to determine a trend associated with the consumer appliances. For example, appliance 3 has an external parameter 520 of 85 degrees, with a condition 525 of 60%. In comparison, appliance 8 has an external parameter of 65, with a condition 525 of 86 degrees. The condition based optimization module 225 may use this information to determine that if the consumer appliance is subjected to a higher external parameter 520 (e.g., temperature), the consumer appliance's condition degrades at a faster rate. The condition based optimization module 225 can use this trend to recommend storing the consumer appliance in cooler location (e.g., in an air conditioned location) versus a hotter location (e.g., a garage in the summer). The condition based optimization module 225 may use the external parameter 520 to determine operating parameters for the consumer appliance. For example, the condition based optimization module 225 may reduce the power settings of the consumer appliance to ensure the consumer appliance does not overheat if the external parameter temperature is too high. In this manner, the condition based optimization module 225 uses the external parameter 520 to determine optimized settings for the consumer appliance. While a single external parameter is shown for ease of explanation, a person skilled in the art would appreciate that any number and type, including external and internal, of parameter may be used.

The chart 500 has the condition 525 of the appliances. Specifically, condition 525 shows a percentage out of 100 of each of the respective consumer appliances. The condition based optimization module 225 may use the condition 525 along with additional information (e.g., location, status, age, etc.) to determine a trend for the consumer appliances. For example, the condition based optimization module 225 may use the status 515 of the appliances to look for appliances with a status 515 of ERROR, which are appliances 3, 10, and 11 in chart 500. The condition based optimization module 225 may look at the other columns of the chart to determine if there is a common connection between the devices with the ERROR status 515. As shown, the appliances 3, 10, and 11 each have an age 530 of 5 years or greater. Thus, condition based optimization module 225 may determine that there is a trend that as the model 510 ABC is in service for longer than 5 years, a higher tendency of failure exists. The condition based optimization module 225 may use this information to determine the best settings for operating the appliance to prevent any further errors. Further, the condition based optimization module 225 may use the optimized settings 540 to keep track of whether each of the appliances has the optimal settings for operating and update those appliances that do not have optimized settings 540.

The chart 500 has the age 530 of the respective consumer appliances. Specifically, the age 530 is shown in years of use. While years are used for simplicity, a person skilled in the art should appreciate any indicator the age of the consumer appliance may be used such as duty cycles, hours run, etc. The chart 500 has the location 535 of the consumer appliance. As shown, the consumer appliance are located within the states of North Carolina, New York, Arizona, South Carolina, Georgia, Florida, Virginia, and Texas. The condition based optimization module 225 may use the location 535 of the consumer appliances to determine a trend based on location. For example, appliances 10 and 11 both have a location 535 of Texas, and both have a status 515 of ERROR. The condition based optimization module 225 may use this information from chart 500 to determine that the model 510 ABC has a higher likelihood of producing an error message when the appliance is located in Texas as compared to other locations. Thus, the condition based optimization module 225 may determine a trend based on the location 535 and status 515 of the consumer appliances to determine optimized settings 540 for appliances 10 and 11.

Figure 6:
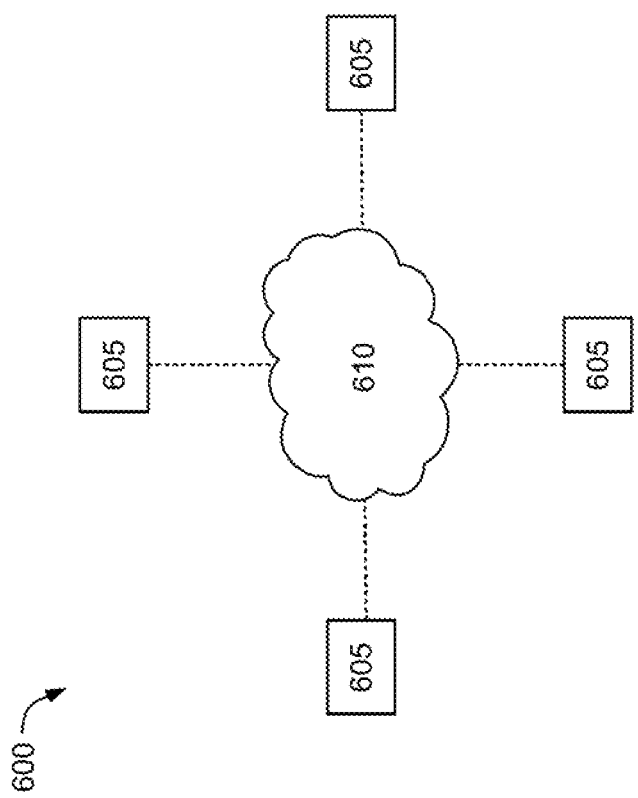
FIG. 6 illustrates a cloud computing system, according to one embodiment herein.

FIG. 6 illustrates a cloud computing system 600, according to one embodiment described herein. The cloud computing system 600 is the same as computing system 100 as illustrated in FIGS. 1 and 2 except that the database 110 is replaced with a cloud computing network 610. Thus, the cloud computing system 600 has all the functionality of the systems described above. As shown, the computing system 600 includes a plurality of consumer appliances 605 communicatively coupled with a cloud computing network 610. The consumer appliances 605 may be any consumer device such as a microwave, a washing machine, a dishwasher, an air conditioning unit, and so forth. In one embodiment, the cloud computing network 610 is a distributed computing device and includes a plurality of discrete computing consumer appliances that are connected through wired or wireless networking. In one embodiment, the cloud computing network 610 is the network as described with regards to FIGS. 7 and 8. While four consumer appliances 605 have been illustrated for simplicity, the system may contain any number and type of devices, and should not be limited to the embodiment shown.

In one embodiment, the consumer appliances 605 are communicatively coupled with the cloud computing network 610 such that the consumer appliances 605 may transmit and receive data to and from the cloud computing network 610. For example, the cloud computing network 610 may communicate with the consumer appliances 605 via any suitable wireless communication method, such as Wi-Fi. As another example, the consumer appliances 605 may be physically connected with the cloud computing network 610 via a wired connection, such as Ethernet cables, and the cloud computing network 610 communicates with the consumer appliances 605 via the Ethernet cables. Further, the consumer appliances 605 may be connected to an external network (not shown), such as the Internet, or to additional consumer appliances 605. While a single cloud computing network 610 is shown for ease of explanation, it is to be understood that any number of servers and databases may be used and should not be limited to the embodiment shown.

In one embodiment, the cloud computing network 610 receives data transmitted from the consumer appliances 605. The cloud computing network 610 may store historical operating data, sensor data, operating parameters, and thresholds of the consumer appliances 605. Further, the cloud computing network 610 may store optimized parameters and updated thresholds for the consumer appliances 605. In one embodiment, the cloud computing network 610 determines the optimized parameters of the consumer appliances 605 based on the data stored within the cloud computing network 610. The cloud computing network 610 may transmit the optimized parameters to the consumer appliances 605. While transmitting optimized parameters are described, it should be understood the cloud computing network 610 can transmit any parameter, threshold, setting, etc., and should not be limited to the aforementioned examples.

Figure 7:
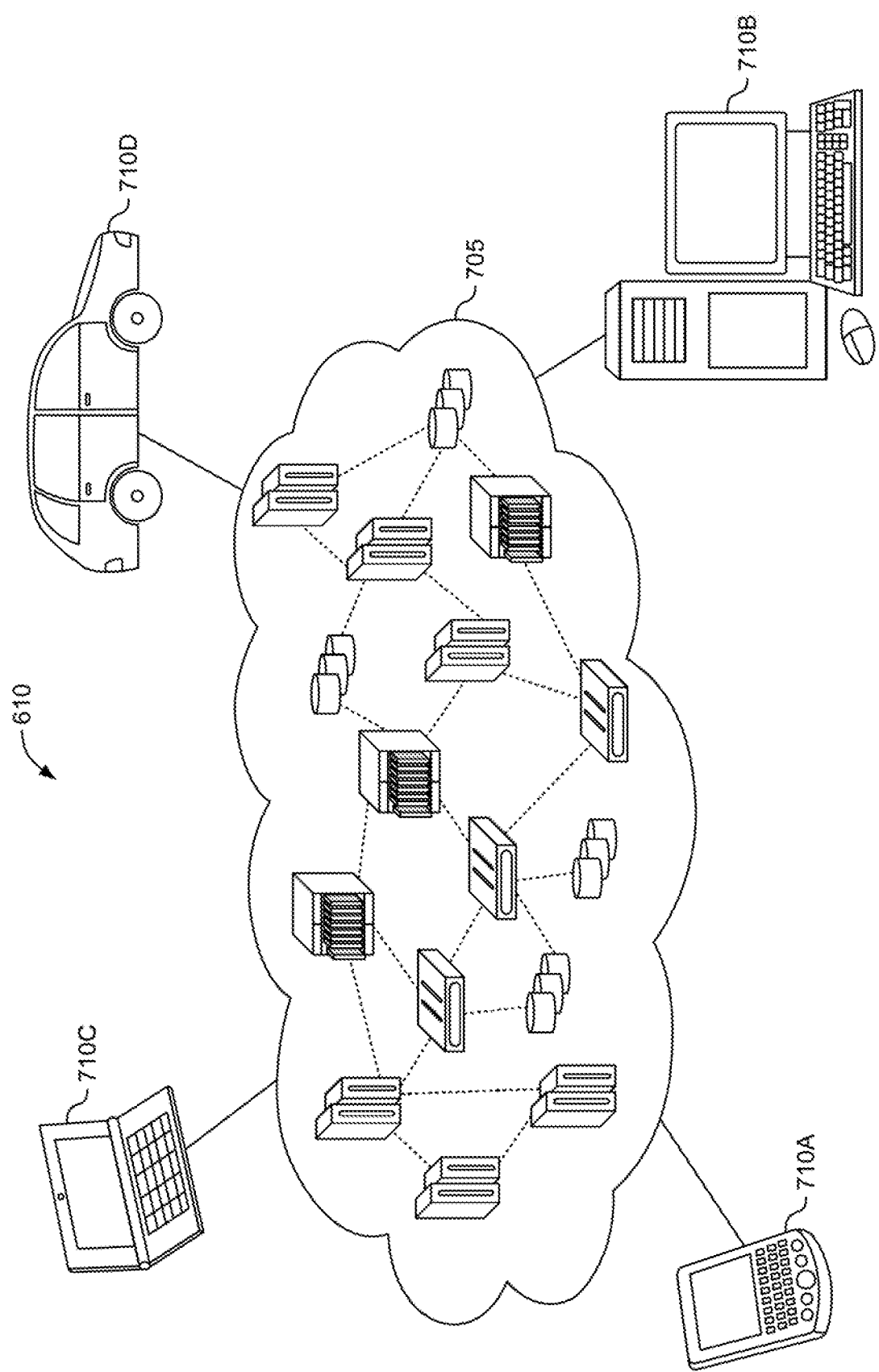
FIG. 7 illustrates a cloud computing environment, according to one embodiment herein.

FIG. 7 illustrates the cloud computing network 610, according to one embodiment herein. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring back to FIG. 7, the cloud computing network 610 includes one or more cloud computing nodes 705 with which local computing devices used by cloud consumers, such as, for example, consumer appliances (not shown), personal digital assistant (PDA) or cellular telephone 710A, desktop computer 710B, laptop computer 710C, and/or automobile computer system 710D may communicate. The nodes 705 may communicate with one another. They may be grouped (not shown) physically or virtually, in one or more networks, such as Private, Community, Public, or Hybrid clouds as described hereinabove, or a combination thereof. This allows cloud computing network 610 to offer infrastructure, platforms and/or software as services for which a cloud consumer does not need to maintain resources on a local computing device. It is understood that the types of computing devices 710A-D shown in FIG. 7 are intended to be illustrative only and that computing nodes 705 and cloud computing network 610 can communicate with any type of computerized device over any type of network and/or network addressable connection (e.g., using a web browser) such as consumer appliances.

Figure 8:
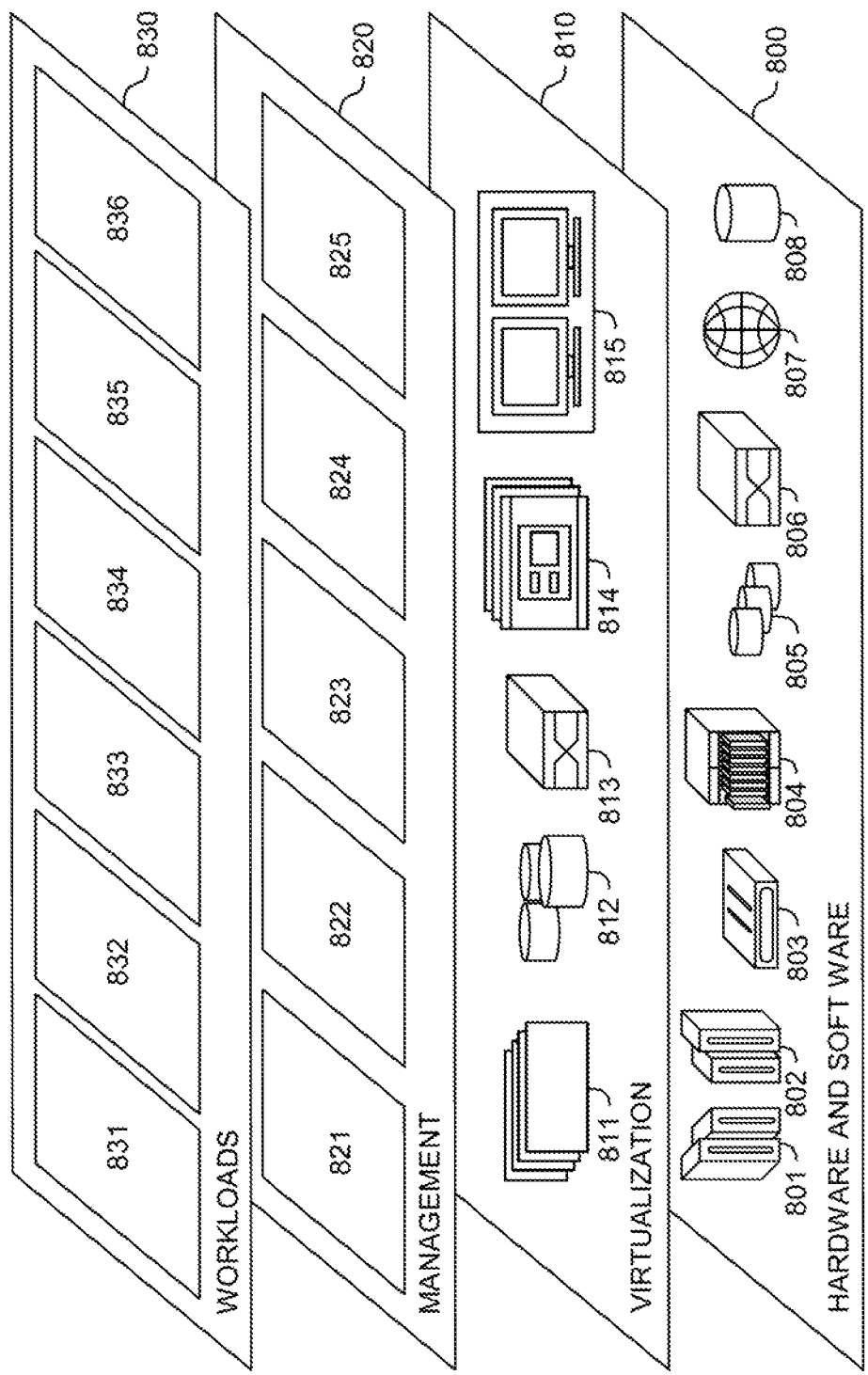
FIG. 8 illustrates abstract model layers, according to one embodiment herein.

Referring now to FIG. 8, a set of functional abstraction layers provided by cloud computing network 610 (FIGS. 6 and 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 800 includes hardware and software components. Examples of hardware components include: mainframes 801; Reduced Instruction Set Computer (RISC) architecture based servers 802; servers 803; blade servers 804; storage devices 805; and networks and networking components 806. In some embodiments, software components include network application server software 807 and database software 808.

Virtualization layer 810 provides an abstraction layer from which the following examples of virtual entities may be provided: virtual servers 811; virtual storage 812; virtual networks 813, including virtual private networks; virtual applications and operating systems 814; and virtual clients 815.

In one embodiment, management layer 820 may provide the functions described below. Resource provisioning 821 provides dynamic procurement of computing resources and other resources that are utilized to perform tasks within the cloud computing environment. Metering and Pricing 822 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 823 provides access to the cloud computing environment for consumers and system administrators. Service level management 824 provides cloud computing resource allocation and management such that required service levels are met. Service Level Agreement (SLA) planning and fulfillment 825 provide pre-arrangement for, and procurement of, cloud computing resources for which a future requirement is anticipated in accordance with an SLA.

Workloads layer 830 provides examples of functionality for which the cloud computing environment may be utilized. Examples of workloads and functions which may be provided from this layer include: mapping and navigation 831; software development and lifecycle management 832; virtual classroom education delivery 833; data analytics processing 834; transaction processing 835; and condition based optimization for a device's operating parameters 836.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications (e.g., condition based optimization) or related data available in the cloud. For example, the condition based optimization module could execute on a computing system in the cloud and determine the optimum operating parameters for a device based on the condition of the device. In such a case, the condition based optimization module could determine the operating parameters and store data from a plurality of devices at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   receiving respective operating conditions associated with a plurality of consumer appliances that are communicatively coupled to a database, wherein each of the operating conditions is based on sensor measurements obtained from a plurality of sensors associated with the plurality of consumer appliances, and wherein each of the plurality of consumer appliances is a same type of appliance;
   generating historical data tracking a first type of component of the plurality of consumer appliances based on the respective operating conditions;
   identifying, based on the historical data, a trend corresponding to the first type of component;
   determining, based on the trend, a first set of optimal operating parameters for operating the first type of component;
   updating a first set of initial operating parameters of a first consumer appliance of the plurality of computer appliances based on the first set of optimal operating parameters to generate an updated operating parameter for a first component of the first consumer appliance, wherein the first set of initial operating parameters is determined by the manufacturer of the first consumer appliance;
   transmitting the first set of updated operating parameters to the first consumer appliance to effect a change in an operation of the first component;
   determining a weight indicative of an importance of the first component; and
   determining a second set of optimal parameters for the first consumer appliance based on the weight associated with the first component and a condition of the first component.

2. The method of claim 1, wherein the first consumer appliance is communicatively coupled with a cloud computing system, and wherein the database is within the cloud computing system.

3. The method of claim 1, wherein the database self-learns the second set of optimal operating parameters.

4. The method of claim 3, wherein the database self-learning comprises:
   receiving data relating to of the first component,
   identifying, based on the failure data, a failure trend for the first component,
   determining, based on the failure trend, a failure reducing set of optimal operating parameters to reduce the likelihood of failure of the first component,
   updating the operating parameters for each of the plurality of consumer appliances based on the failure reducing set of optimal operating parameters, and
   transmitting the failure reducing set of optimal operating parameters to the plurality of consumer appliances.

5. The method of claim 4, wherein a respective operating parameter of the plurality of respective parameters is based on a plurality of respective conditions of each of a plurality of components of the first consumer appliance.

6. The method of claim 1, wherein a first operating condition of the respective operating conditions associated with the first consumer appliance is based on conditions of a plurality of components of the first consumer appliance.

* * * * *